United States Patent
Clift

(10) Patent No.: US 10,743,057 B2
(45) Date of Patent: Aug. 11, 2020

(54) BROADCASTER APPLICATION REMOTE CONTROL KEY HANDLING

(71) Applicant: SONY CORPORATION, Tokyo (JP)

(72) Inventor: Graham Clift, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 16/199,089

(22) Filed: Nov. 23, 2018

(65) Prior Publication Data

US 2020/0169778 A1    May 28, 2020

(51) Int. Cl.
- *H04N 21/422* (2011.01)
- *H04N 21/2387* (2011.01)
- *H04H 60/29* (2008.01)
- *H04H 60/23* (2008.01)

(52) U.S. Cl.
CPC ...... *H04N 21/42209* (2013.01); *H04H 60/23* (2013.01); *H04H 60/29* (2013.01); *H04N 21/2387* (2013.01)

(58) Field of Classification Search
None
See application file for complete search history.

(56) References Cited

U.S. PATENT DOCUMENTS

| | | |
|---|---|---|
| 6,665,869 B1 | 12/2003 | Ellis et al. |
| 2004/0139464 A1 | 7/2004 | Ellis et al. |
| 2007/0150833 A1 | 6/2007 | Kim |
| 2010/0122292 A1 | 5/2010 | Ellis et al. |
| 2011/0093894 A1 | 4/2011 | Ellis et al. |
| 2011/0099573 A1 | 4/2011 | Ellis et al. |
| 2018/0048843 A1* | 2/2018 | Duan ............... H04N 21/42204 |
| 2019/0200068 A1* | 6/2019 | Gare .................. H04N 21/4314 |

FOREIGN PATENT DOCUMENTS

WO    WO 99/13641 A1    3/1999

OTHER PUBLICATIONS

International Search Report and Written Opinion dated Jan. 7, 2020 in PCT/IB2019/060008, 12 pages.

(Continued)

*Primary Examiner* — Omar S Parra
(74) *Attorney, Agent, or Firm* — Oblon, McClelland, Maier & Neustadt, L.L.P.

(57) ABSTRACT

A reception apparatus includes a receiver and processing circuitry. The receiver circuitry configured to receive a broadcast stream that includes television content. The processing circuitry executes a television receiver application that displays the television content. The processing circuitry receives indication of a selection of a key that is provided on an input device. In response to reception of the indication of the selection of the key, the processing circuitry determines whether a broadcaster application has reserved the selected key. In response to the determination that the broadcaster application has reserved the selected key, the processing circuitry determines whether a native application associated with the broadcaster application has reserved the selected key. The processing circuitry processes, by the native application, the selected key in response to the determination that the broadcaster application has reserved the selected key and the native application has reserved the selected key.

20 Claims, 13 Drawing Sheets

(56) References Cited

OTHER PUBLICATIONS

Cable Television Labs: "OpenCable Application Platform Specifications; OpenCable Application Platform (OCAP)", OC-SP-OCAP1.3.1-130530, May 30, 2013, 19 pages.
DVB Organization: "ATSC Candidate Standard: Revision of ATSC 3.0 Interactive Content (A/344)", ATSC S34-306r1, Apr. 27, 2018, 160 pages.

* cited by examiner

BROADCASTER APPLICATION REMOTE CONTROL KEY HANDLING

TECHNICAL FIELD

The present disclosure relates to an apparatus, computer readable medium, and method that allow applications developed by television broadcasters to process remote control keys.

BACKGROUND

With the impending launch of broadcasts and receivers supporting the Advanced Television Systems Committee (ATSC) 3.0 digital television standard, broadcasters of television content will be able to offer interactive elements alongside the traditional video/audio/caption content. Rather than simply displaying traditional television content, the ATSC 3.0 standard provides broadcasters with more control to offer interactive elements that enhance a broadcaster's brand, as well as enhance a user's viewing experience. The interactive elements may come in the form of a broadcaster application, which may be downloaded, launched and executed in parallel with broadcast television programming. However, the ability of the broadcaster application to interact with the user can be limited by the support provided by the ATSC 3.0 standard.

SUMMARY

According to an embodiment of the present disclosure, there is provided a reception apparatus including receiver circuitry and processing circuitry. The receiver circuitry is configured to receive a broadcast stream that includes television content. The processing circuitry is configured to execute a television receiver application that displays the television content. The processing circuitry is further configured to receive indication of a selection of a key that is provided on an input device. In response to reception of the indication of the selection of the key, the processing circuitry is further configured to determine whether a broadcaster application has reserved the selected key. In response to the determination that the broadcaster application has reserved the selected key, the processing circuitry is further configured to determine whether a native application associated with the broadcaster application has reserved the selected key. The processing circuitry is further configured to process, by the native application, the selected key in accordance with a first predetermined function specified by the native application in response to the determination that the broadcaster application has reserved the selected key and the native application has reserved the selected key.

According to an embodiment of the present disclosure, there is provided a non-transitory computer-readable medium storing instructions, which when executed by a processor, cause the processor to perform a method. The method includes receiving a broadcast stream that includes television content. The method further includes executing a television receiver application that displays the television content. The method further includes receiving indication of a selection of a key that is provided on an input device. The method further includes, in response to reception of the indication of the selection of the key, determining whether a broadcaster application has reserved the selected key. The method further includes, in response to the determining that the broadcaster application has reserved the selected key, determining whether a native application associated with the broadcaster application has reserved the selected key. The method further includes processing, by the native application, the selected key in accordance with a first predetermined function specified by the native application in response to the determination that the broadcaster application has reserved the selected key and the native application has reserved the selected key.

According to an embodiment of the present disclosure, there is provided a non-transitory computer-readable medium storing instructions, which when executed by a processor, cause the processor to perform a method. The method includes receiving, from a television receiver application, a first message indicating a user selection of a key. The method further includes, in response to receiving the first message from the television receiver application, determining whether the selected key has been reserved by a native broadcaster application. The method further includes processing the selected key in accordance a predetermined function in response to determining that the native broadcaster application has not reserved the selected key. The method further includes sending, in a second message, the selected key to the native broadcaster application in response to determining that the native broadcaster application has reserved the selected key.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
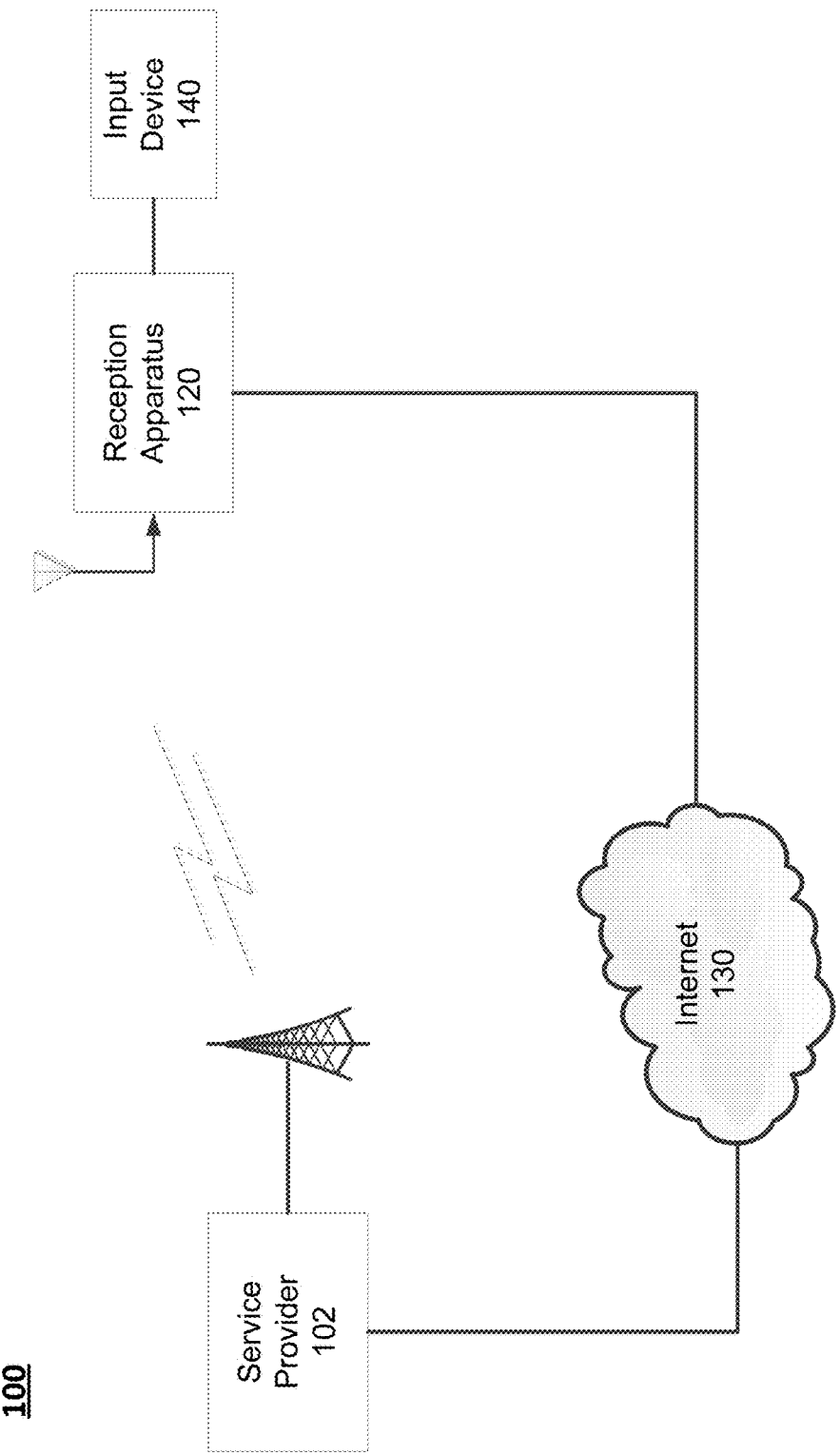
FIG. 1 illustrates an exemplary digital television broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic service guide (ESG) as a single television program, without regard for whether the content is a movie, sporting event, segment of a multi-part series, news broadcast, etc. The term may also be interpreted to encompass commercial spots and other program-like content which may not be reported as a program in an ESG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to providing access to remote control key handling for multiple types of broadcaster applications.

The ATSC Standard: ATSC 3.0 Interactive Content (Doc. A/344:2017 dated Dec. 18, 2017), which is incorporated by reference in its entirety (hereinafter "A/344 Standard") provides support to allow a broadcaster application of a predefined type to request key inputs for interaction with a user. The A/344 Standard calls these types of applications "Broadcaster Applications." The broadcaster application can incorporate the functionality embodied in a collection of files comprised of an HTML5 document, known as the Entry Page and other HTML5, CSS, JavaScript, image and multimedia resources referenced directly or indirectly by that document, all provided by a broadcaster in an ATSC 3.0 service.

The ATSC 3.0 standard specifies an environment in which broadcaster applications can be downloaded and executed in the receiver in conjunction with regular TV programming (or even as a standalone user experience). The ATSC A/344 Standard provides a standardized API that allows the broadcaster application to request use of certain remote control keys for its own functionality. The receiver can choose to grant (or not grant) any such request. Other types of applications, for example an application created by a broadcaster which is installed within the receiver natively (e.g. executed in the native operating system of the receiver) may also wish to use certain remote control keys. This type of application is called herein "native broadcaster application."

A broadcasting entity might work with a digital television (DTV) manufacturer to provide to users an additional type of broadcaster application (e.g., a native broadcaster application) that is created by that broadcaster and is installed in the receiver either when it is purchased or when subsequently selected for download by a user. When the user selects a service associated with that broadcaster, a broadcaster application (e.g., an ATSC 3.0 HTML5 application) that accompanies the broadcast could cause the native broadcaster application to be launched. Furthermore, if the DTV receiver is built on an operating system platform such as Android or iOS, the user can choose the native broadcaster application from among other installed applications (e.g., Netflix, HBO, Prime Video, etc.).

Responses to a user's remote control keypresses should reflect the expected behavior in the context of whatever the user is doing or viewing at the time. Some keys like the "POWER" key are content independent and are expected to function in the same manner regardless of the content being displayed. However, other keys are content-dependent and therefore, may perform different functions depending on the content being displayed.

One example is the Channel-Up (CH-UP) and Channel-Down (CH-DN) keys. While watching live TV, a user expects to change to adjacent channels based on the major/minor channel numbers (e.g., on a "CH-UP" key, going from 4.1 to 4.2 to 4.3 to 6.1, etc.). In a different context though, for example when perusing the ESG, the CH-UP and CH-DN keys could be repurposed as "page-up" and "page-down" keys. In another example, the broadcaster may want to use those keys to navigate only among their own broadcast channels (e.g., continuing the above example, keeping the "channel surfing" to only 4.1, 4.2 and 4.3).

Embodiments of the present disclosure are directed to enabling additional types of broadcaster applications to reserve keys for performing one or more functions specified by the additional types of broadcaster applications. When the user starts viewing a TV program (e.g., either live or retrieved from a digital video recorder), a television receiver application that enables a native "watch TV" functionality in the receiver manages navigation such as selection of channels. For example, the television receiver application captures keys such as CH-UP/CH-DN, and numeric entry keys and the ENTER key. In some embodiments, the television receiver application is operating in accordance with an Advanced Television Systems Committee (ATSC) standard such as the A/344 Standard.

According to some embodiments, when the user selects an ATSC 3.0 Service for viewing (e.g., a television program provided by a broadcaster), the television receiver application can also download and execute a broadcaster application that a broadcaster might make available along with the audio/video/captions comprising the program material. A broadcaster may further make available a native broadcaster application that is associated with this Service and installed in the receiver. If such a native broadcaster application is available, the browser web application can be configured to cause the native broadcaster application to be launched, which provides additional functionality and capability for both the broadcaster and the user. For example, the native broadcaster application can operate in concert with the broadcaster application such that when an ESG is displayed with a live TV broadcast, the CH-UP and CH-DN keys could be repurposed as "page-up" and "page-down" keys.

According to some embodiments, the broadcaster application is an HTML5 Application that is provided with the television content. As noted above, an HTML5 Application may include a collection of files comprised of an HTML5 document, known as the Entry Page and other HTML5, CSS, JavaScript, image and multimedia resources referenced directly or indirectly by that document. The HTML5 Application may be provided by the broadcaster as part of an ATSC 3.0 service. An Entry Page is the initial HTML5 document referenced by an application signaling that may be loaded first into a User Agent. The User Agent may be any program in a reception apparatus that renders Web content.

The native broadcaster application may be a type of broadcaster application that that runs natively on the same operating system platform used by the TV such as for example Android, iOS, MAC OS, Windows, or Tizen. The native broadcaster application is referred to as a "native" application, since the application (after being downloaded and installed, if not pre-installed at the time of manufacture) is present in the DTV receiver in a persistent way.

In some embodiments, the ability of a broadcaster application to interact with the user via a television receiver application is predetermined by a preexisting standard such as the A/344 Standard. However, native broadcaster applications are not covered in the A/344 Standard. The A/344 Standard defines WebSocket APIs to allow the broadcaster application to request keys (see A/344 Standard at Section 9.11, Keys APIs) including those corresponding to named functions as defined by W3C in "UI Events KeyboardEvent key Values" (W3C Candidate Recommendation, dated Jun. 1, 2017), the entire contents of which are incorporated by reference. The Candidate Recommendation specifies, for example, that the standardized names for the arrow keys on the remote control unit are "ArrowDown," "ArrowUp," "ArrowLeft," and "ArrowRight" (see Section 3.4, Navigation Keys).

The present embodiments disclose how additional types of applications, such as the native broadcaster application, can reserve keys for performing functions of the native broadcaster application. Because the interaction between the television receiver application and the native broadcaster application is not defined in any standard, the interaction between the native broadcaster application and the television receiver application may be specified via proprietary APIs agreed between the manufacturer of the receiver and the broadcaster.

FIG. 1 is an exemplary digital television broadcast system 100 for providing access to television content. The system includes a service provider 102, a reception apparatus 120, and an input device 140. The reception apparatus 102 may be configured to receive a broadcast stream (e.g., an ATSC 3.0 broadcast stream) via an antenna. The reception apparatus 102 may further be configured to connect to the Internet 130 to receive data.

In one example, the service provider 102 is a broadcaster of television content and the reception apparatus 120 may be any device that includes or is otherwise connected to a DTV receiver and is configured to process and display content included in the broadcast stream, such as a flat screen TV, laptop, tablet, or smart phone. The input device 140 may be physically or wirelessly connected to the reception apparatus 120 and may be any device suitable to operate the reception apparatus 120 such as a remote with numeric keys and/or alphanumeric keys or a QWERTY keyboard. The keys on the input device 140 may be either physical buttons or the digital representation of numeric or alphanumeric keys on a touchscreen. Embodiments of the present disclosure may be utilized to provide access to other broadcast content (e.g., executable applications such as HTML5 applications). The service provider 102 transmits the broadcast stream that includes television content and may be delivered via a digital television broadcast signal.

The service provider 102 (e.g., a broadcaster entity or broadcast station), in one embodiment, is a service distribution system that includes a transmission apparatus with a transmitter that is configured to transmit content, applications, and/or services in a data stream (e.g., a broadcast stream) to the reception apparatus 120. The transmitter is configured to provide the data stream to the reception apparatus 120, for example via a digital terrestrial broadcast. In other examples, the data stream may be transmitted to the reception apparatus 120 over one or a combination of the digital terrestrial broadcast, a mobile phone network, a broadband network such as the Internet, a cable network, and a satellite link. The service distribution system may use any one or a variety of transmission techniques to communicate the data stream to the reception apparatus 120.

The service distribution system according to one embodiment includes a source encoder, a channel encoder, and a modulator. The source encoder includes data, audio, and video encoders to compress the audio, video, signaling, control or other data received from a source. The channel encoder randomizes, interlaces, channel codes, and frame maps the compressed media and signaling data. For example, the channel encoder includes a frame builder that forms many data cells into sequences to be conveyed on orthogonal frequency-division multiplexing (OFDM) symbols. The modulator (e.g., a multiplexer) converts the processed digital data into modulation symbols, which can be, for example OFDM symbols. The multiplexed data is then passed to an inverse fast Fourier transformer (IFFT) which transforms a frequency domain signal into a time domain signal. The time domain signal is fed to a guard insertion module for generating a guard interval (GI) between symbols and then to a digital-to-analog (D/A) converter. Then, up-conversion, RF amplification, and over-the air broadcasting are performed to transmit a broadcast stream.

Certain components of the transmission apparatus or the reception apparatus may not be necessary in other embodiments. Details of an OFDM transmitter and receiver may be found, for example, in the DVB-T2 standard (ETSI EN 302, 755 V1.4.1 dated Jul. 1, 2015), ATSC Standard A/322—Physical Layer Protocol (Doc. A/322:2017 dated Jun. 6, 2017), and ATSC Standard A/321—System Discovery and Signaling (Doc. A/321:2016 dated Mar. 23, 2016), each of which are incorporated herein by reference in their entirety.

Figure 2:
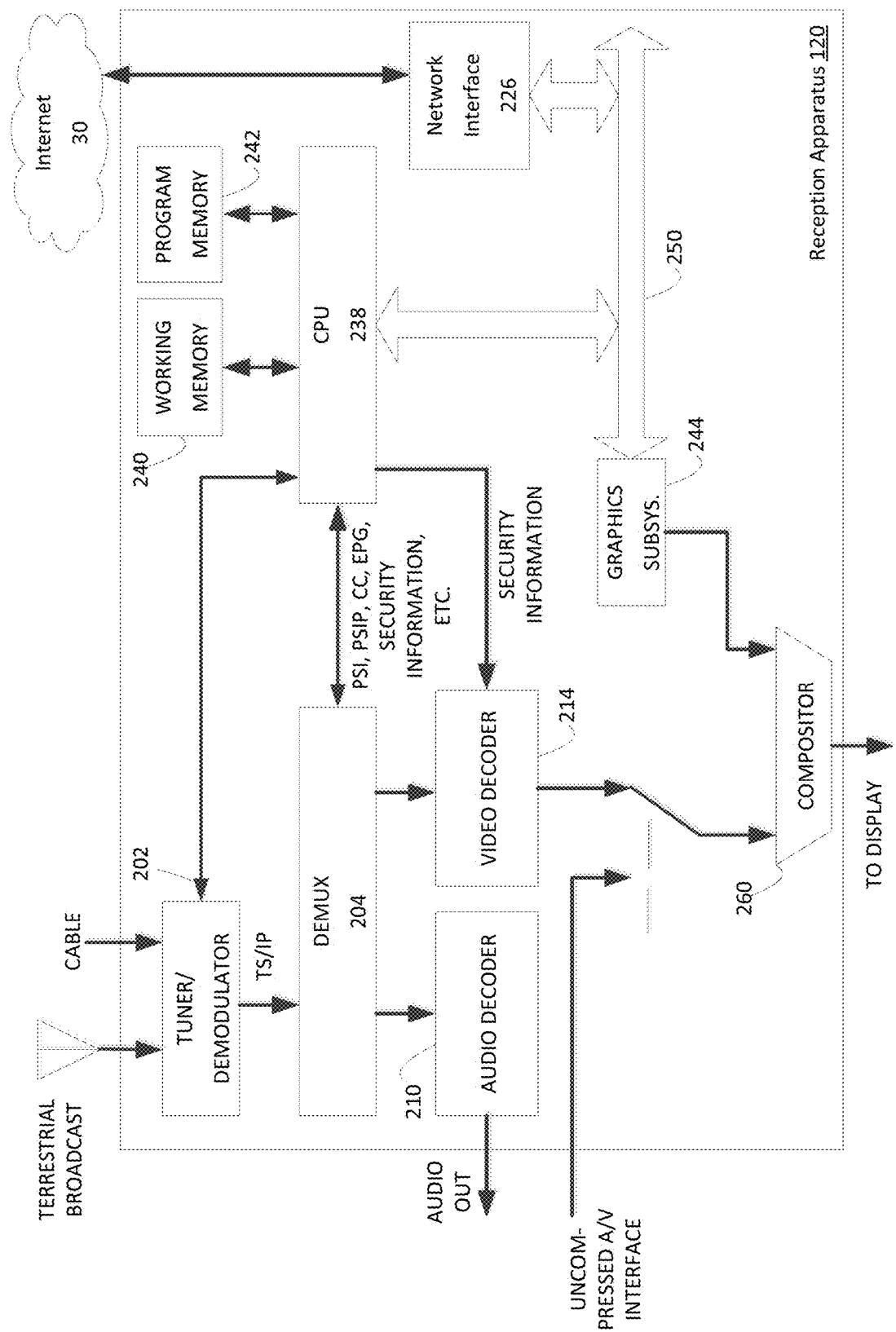
FIG. 2 illustrates an exemplary reception apparatus.

FIG. 2 illustrates an exemplary reception apparatus 120, which is configured to access television content and broadcaster applications. The reception apparatus 120 may be a fixed or mobile device such as a television set, a set top box, smartphone, tablet computer, laptop, portable computer, or any other device configured to receive television content. Further, the reception apparatus 120 may include a DTV receiver that is incorporated in, or otherwise connected to, a vehicle or any of the fixed or mobile devices described above.

The reception apparatus 120 includes receiver circuitry that is configured to receive a data stream (e.g., a broadcast stream) from one or more service providers 102 and processing circuitry that is configured to perform various functions of the reception apparatus 120. In one embodiment, a tuner/demodulator 202 receives broadcast emissions containing the broadcast stream. Depending on the embodiment, the reception apparatus 120 may alternatively or additionally be configured to receive a cable television transmission or a satellite broadcast. The tuner/demodulator 202 receives the data stream which may be demultiplexed by the demultiplexer 204 or handled by middleware and separated into audio and video (A/V) streams. The audio is decoded by an audio decoder 210 and the video is decoded by a video decoder 214. Further, uncompressed A/V data may be received via an uncompressed A/V interface (e.g., a HDMI interface), if available.

The reception apparatus 120 generally operates under control of at least one processor, such as the CPU 238, which is coupled to a working memory 240, program memory 242, and a graphics subsystem 244 via one or more buses (e.g., bus 250). The CPU 238 is configured to generate a user interface for a user to acquire license information to access the protected service according to one embodiment. The graphics outputted by the graphics subsystem 244 are combined with video images by the compositor and video interface 260 to produce an output suitable for display on a video display.

The CPU 238 operates to carry out functions of the reception apparatus 120 including executing script objects (control objects) contained in a broadcaster application (e.g., HTML5 application) using for example an HTML5 User Agent stored in the program memory 242, and other types of broadcaster applications such as one or more native broadcaster applications.

In one embodiment, the collection of files making up the broadcaster application can be delivered over broadcast as packages, via the ROUTE protocol described in ATSC Proposed Standard A/331 (Doc. S33-331r1 dated Nov. 7, 2017) for example and incorporated by reference in its entirety. An exemplary broadcaster application framework is described in the ATSC A/344 Standard.

The CPU 238 may be coupled to any one or a combination of the reception apparatus 120 resources to centralize control of one or more functions, in certain embodiments. In one embodiment, the CPU 238 also operates to oversee control of the reception apparatus 120 including the tuner/demodulator 202 and other television resources.

Figure 3:
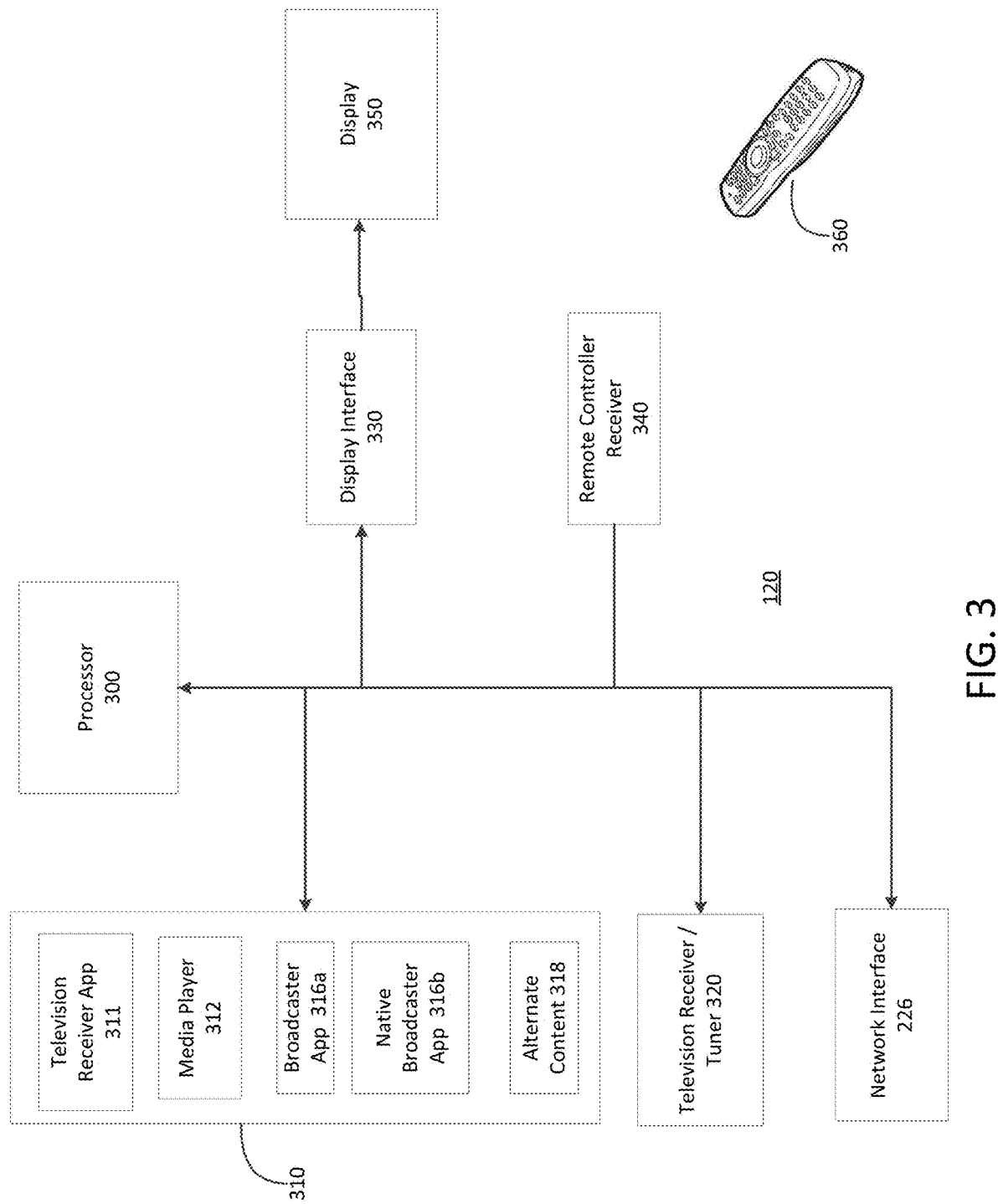
FIG. 3 is a processor-centric block diagram of an exemplary reception apparatus.

A more processor-centric view of the reception apparatus 120 is illustrated in FIG. 3. Memory 240 and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 120 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 120 as in a television set or a connected display device as in the case where the reception apparatus 120 is integrated into a set-top box.

Memory 310 contains various functional program modules and data. The memory 310 stores the data used by the reception apparatus 120. The memory 310 within the reception apparatus 120 can be implemented using disc storage form as well as other forms of storage such as non-transitory storage devices including, for example, network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

The memory 310 includes the television receiver application 311 (e.g., an ATSC 3.0 Receiver Application). Both the broadcaster application 316a and native broadcaster application 316b are stored in the memory 310. The broadcaster application 316a may be an HTML5 application that is included in a broadcast stream. The native broadcaster application 316b may either be provided with the reception apparatus 120 or installed at a later time (e.g., downloaded from an app store). The broadcaster application 316a and native broadcaster 316b are executed by the processor 300. Further, these applications may cause the processor 300 to control the reception apparatus 120 to acquire alternate content 318, which is stored in the memory 310 for subsequent retrieval. In another embodiment, the processor 300 causes the reception apparatus 120 to retrieve or stream the alternate content 318 at the time of presentation.

Figure 4:
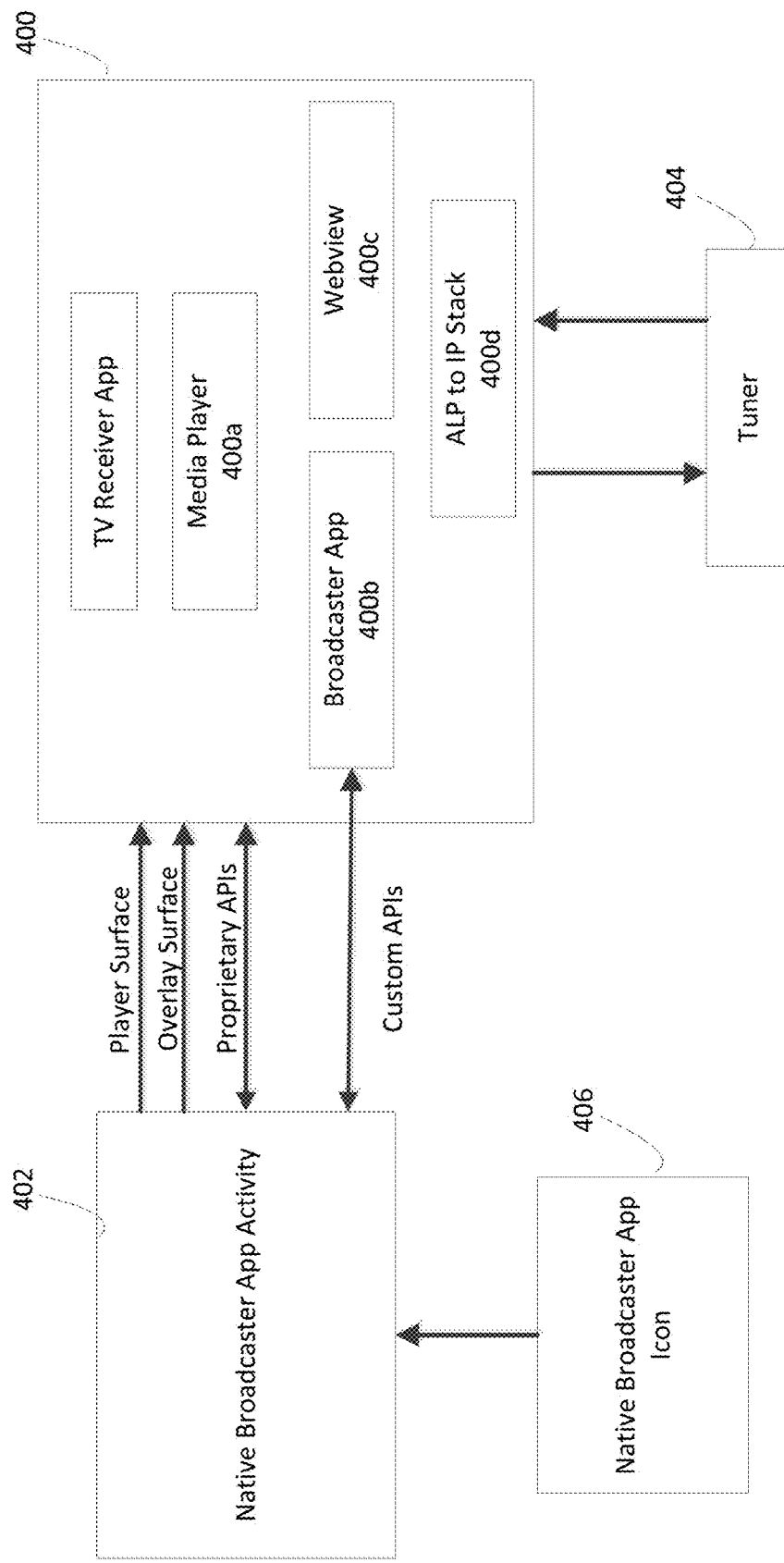
FIG. 4 illustrates an exemplary relationship between a television receiver application and a native broadcaster application that is executed while a user is using a service associated with the native broadcaster application.

FIG. 4 illustrates an embodiment of a relationship between a television receiver application 400 and a native broadcaster application 402 that is executed while a viewer is enjoying an ATSC Service associated with the native broadcaster application 402. The native broadcaster application 402 may be visible to the user and activated by a displayed native broadcaster app icon 406. The television receiver application 400 may include a Media Player 400a that is configured to decode and render content. The television receiver application 400 is in communication with a tuner 404 that receives, for example, ATSC 3.0 Link-Layer Protocol (ALP) packets in a television broadcast stream, where the ALP packets are converted to IP packets by an ALP to IP stack 400d. The television receiver application 400 may further include functionality in 400c such as WebView that is used to run the broadcaster application 400b.

In the example illustrated in FIG. 4, the broadcaster may be ZTV and the native broadcaster application 402 may be called "ZTV-Now." This example illustrates that ZTV has provided a broadcaster application 400b that may execute in parallel with the native broadcaster application 402. The broadcaster application 400b can communicate with the native broadcaster application 402 via custom APIs (e.g., "Custom APIs" in FIG. 4). The custom APIs may be specific to the DTV manufacturer or agreed upon between any combination of different DTV manufacturers and/or broadcasters. The television receiver application 400 provided by the DTV manufacturer can also support other proprietary APIs (e.g. "Proprietary APIs" in FIG. 4) usable by the native broadcaster application 402. Further, the native broadcaster application 402 could instruct the player surface to modify the display of video or the overlay surface to overlay a graphical output onto the video displayed on the player surface. For example, the native broadcaster application 402 instructs the player surface to scale the display of video to allow more display area for graphics. In another example, the native broadcaster application 402 provides a graphical output that is overlaid onto the video displayed on the player surface. Any receiver operating system that supports receiver native broadcaster applications and broadcaster applications provides functionality that allows applications to overlay graphics and text, on top of video, or on top of other graphics and text, under control of the executing applications.

In some embodiments, the DTV manufacturer can provide a mechanism to allow a native broadcaster application to communicate with one of that same broadcaster's web applications whenever both of these types of applications are executing. For example, one API may be provided that allows the native broadcaster application to deliver a JavaScript Object Notation (JSON) Object across the interface to the broadcaster application. Furthermore, a different API may be provided that allows the broadcaster application to deliver a JSON Object across the interface to the native broadcaster application. Thus, a general-purpose bi-directional data communication channel may be made available. JSON Objects are formatted as key/value pairs. The keys are strings, and values can contain any valid JSON data type (string, number, object, array, Boolean or null).

According to some embodiments, when one broadcaster entity has developed both the native broadcaster application and broadcaster application, the key/value pairs and their meaning and representation are known by both. Accordingly, in this situation, the DTV manufacturer does not need to know how to interpret the JSON Objects that flow between the native broadcaster application and the broadcaster application.

Figure 5:
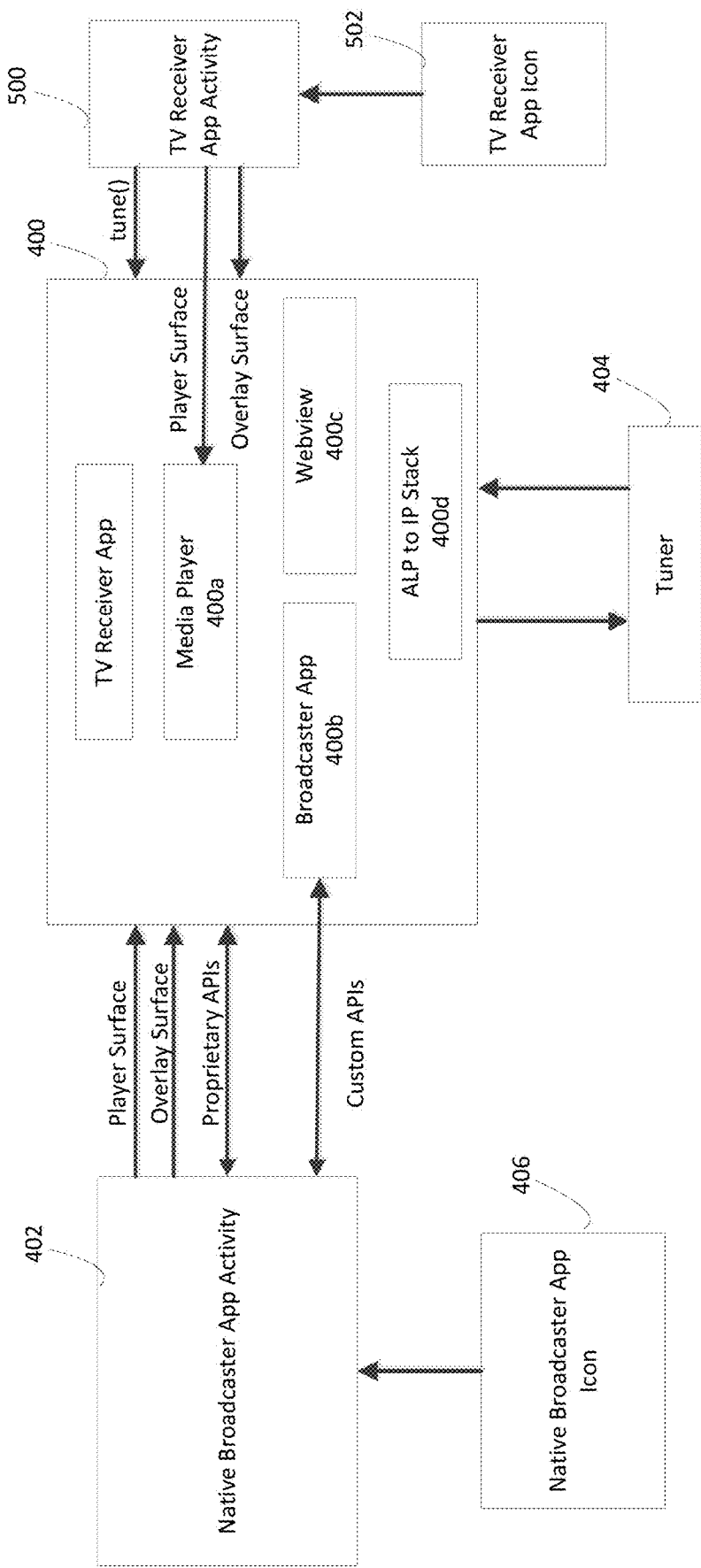
FIG. 5 illustrates an exemplary relationship between an operating system activity and the television receiver application.

FIG. 5 illustrates an embodiment in which a television activity associated with the television receiver application 400 is illustrated on the right side of FIG. 5. As an example, in the operating system (e.g., Android) of the television reception apparatus 120, an Activity is a single, focused thing that the user can do such as selection of an ATSC service that is provided in a television broadcast stream. A user may start the television receiver application 400 by selecting a displayed TV Receiver App Icon 502, which enables the user to interface with the television receiver application 400 and execute a television receiver application Activity 500.

According to some embodiments, the television receiver application 400 processes user interactions such as selection of an ATSC service of a broadcaster (e.g., ZTV) that allows the user to watch a television channel. As an example, if the user presses a numeric key on the remote control, the television receiver application 400 will process the selection of this numeric key. As shown in FIG. 5, a broadcaster application 400b has been downloaded and is executing with the television receiver application 400.

In some embodiments, a broadcaster application reserves keys of an input device via any desired preexisting API. For example, one of ordinary skill in the art may use the WebSocket APIs defined in the A/344 Standard at Section 9.11 (Keys APIs) to allow the broadcaster application to reserve keys including those corresponding to named functions as defined by W3C in "UI Events KeyboardEvent key Values." By use of these APIs, the broadcaster application might have requested that the broadcaster application would like to process numeric keys at the present time. In this situation, the event corresponding to such a keypress would be triggered at the broadcaster application resulting in a function specified by the broadcaster application being performed.

If the broadcaster application has not currently reserved numeric keys of an input device, the television receiver application will note that no current broadcaster application request for numeric keys is active, and will process the key(s) on its own. Such processing might, for example, be to use the numeric keys to change channels (e.g., collect a channel number string like for example "4.1" and an ENTER key terminator and use it to acquire and present the service associated with channel 4.1).

In some embodiments, when a broadcaster application begins execution, the application can determine that it is running in a certain manufacturer's DTV receiver, and thus, know that certain proprietary APIs are usable within the DTV receiver. The broadcaster application may make use of the Query Device Info API (see A/344 Section 9.12) to determine the manufacturer ("deviceMake") and model ("deviceModel") of the receiver, to make such a determination. By use of these proprietary APIs, if the broadcaster that has distributed the broadcaster application has made a native broadcaster application available, the native broadcaster application can be launched. Thus, a broadcaster application and native broadcaster application that are distributed by the same broadcaster (e.g., ZTV) can be executing in parallel as illustrated in FIG. 5.

In some embodiments, the broadcaster applications can execute in parallel with other native applications that are not necessarily provided by the broadcaster. For example, a broadcaster application can be configured to execute a native application that is associated with the television content being displayed. The native application could be provided by the content creator to enhance the user's viewing experience of the television content. For example, a native game application can work with different kinds of game shows and would load when the game show is being presented to a user. The native game application can load in place of the native broadcaster app (e.g., an ZBC native app). In this scenario, a broadcaster application such as an HTML5 app would know how to communicate with the native application via proprietary APIs even if the native application is not provided by the broadcaster.

According to some embodiments, when there are multiple native broadcaster applications, a broadcaster application may be configured to decide which one of the native broadcaster applications to execute. For example, native broadcaster applications A, B, and C may be stored in memory, where the broadcaster application decides which one of these applications to execute depending on whether a particular condition is met such as the broadcaster application being executed at a particular time of day causing one of native broadcaster applications A, B, or C to be executed. In another example, the user may be presented with an interface to select any one of the native broadcaster applications A, B, or C to be executed.

In some embodiments, multiple native broadcaster applications may be running simultaneously that each may reserve keys via one or more or broadcaster applications. For example, native broadcaster applications A, B, and C may be running simultaneously, and each may use the same or different proprietary APIs with a particular broadcaster application to reserve one or more keys.

In some embodiments, the broadcaster application may be configured to include an instruction that causes the television receiver application to retrieve and execute the native broadcaster application. The native broadcaster application may be stored locally on the television receiver apparatus. Furthermore, the broadcaster application may include an instruction that causes the native broadcaster application to be retrieved remotely from an app store (e.g., Google Play, Apple Store, etc.) and installed and executed on the television receiver apparatus.

In accordance with techniques disclosed herein, when both the broadcaster application and native broadcaster application are executing, they can communicate with each other as illustrated in FIG. 5. Both the broadcaster application and native broadcaster application provide various possibilities for display of text or graphics or other multimedia objects, because either one or both of the applications can be made visible to the user.

In one example, a native broadcaster application may have presented the user with a choice to bring up an Electronic Program Guide (EPG) or ESG screen to show the upcoming programs available on the broadcaster (e.g., ZTV) channels available to this user. In the case of the EPG, EPG data may be acquired separate from ESG data by the native broadcaster application. When the user has chosen to display that EPG or ESG screen, with the EPG or ESG in full-screen or even half-screen view, the native broadcaster application may be designed to process numeric entry keys to let the user choose which channel's future programming they want to review. For example, the native broadcaster application may be designed to process keys like CH-UP or CH-DN such that the function of the keys is limited to changing between the broadcaster's different channels. In another example, the expected function of these keys is changed by the native broadcaster application from changing a channel to moving the EPG or ESG view forward or backward in time.

In some embodiments, when adding a proprietary API to a reception apparatus, no extension or modification to an operating system (e.g., Android) of the reception apparatus is needed. For example, for native broadcaster applications (e.g., a ZTV Android Application), if the television receiver application is not already running and the user clicks on the native broadcaster application, this native application will launch the television receiver application. The native broadcaster application and television receiver application can then set up a communication channel, whereby either side can initiate delivery of data or deliver a response to a request made by the other side. The format of the data can be determined by mutual agreement and could, for example, be in the form of a command type and associated parameters (e.g., similar to the way the A/344 WebSocket protocols are used for broadcaster applications). If the television receiver application is already running when the native application is launched, this same communication channel can be opened up. Furthermore, the television receiver application can launch the native broadcaster application and set up this channel.

For broadcaster applications, the proprietary APIs can be extensions to the WebSocket protocols already defined for A/344. For this implementation, the broadcaster and designer of the television reception apparatus can decide on a mutually agreed format for the commands that do not conflict with A/344 or with any potential extension to A/344 that ATSC might make in the future. As one example, a different IP address or port could be used to differentiate between the proprietary extensions and those in the ATSC standard.

Figure 6:
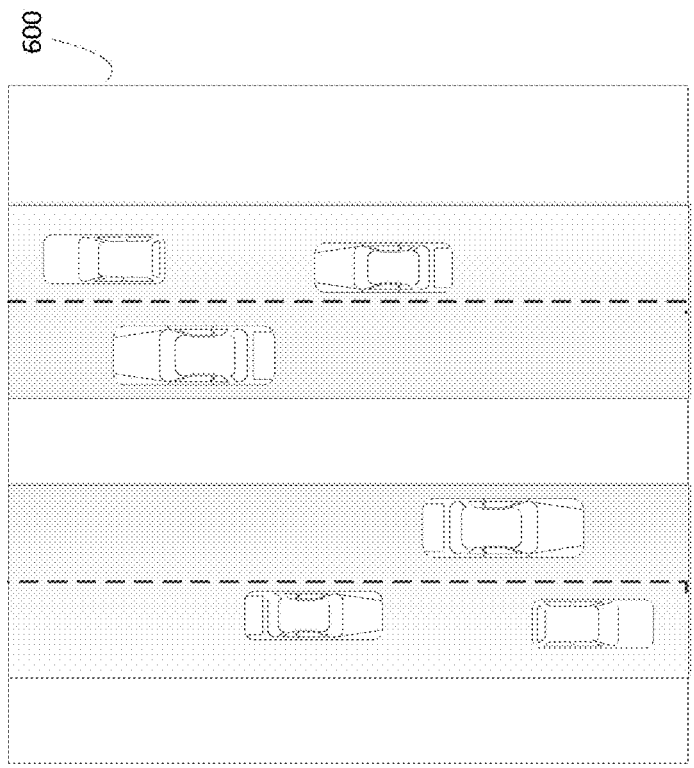
FIGS. 6-8 illustrate and exemplary input device with a display.
Figure 6:
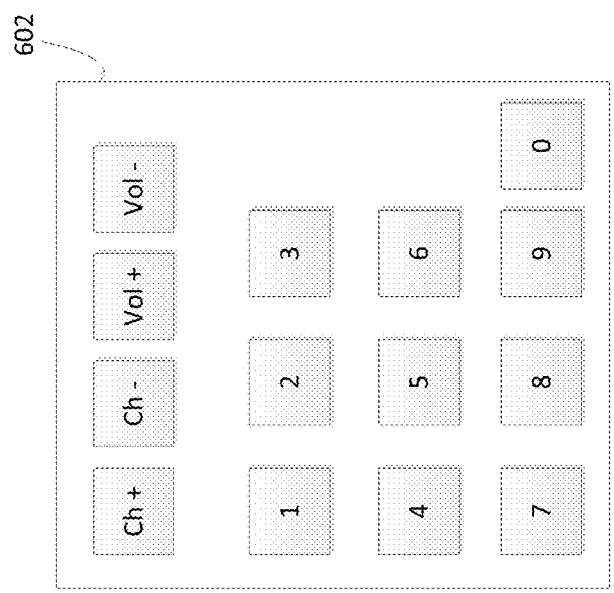
Figure 7:
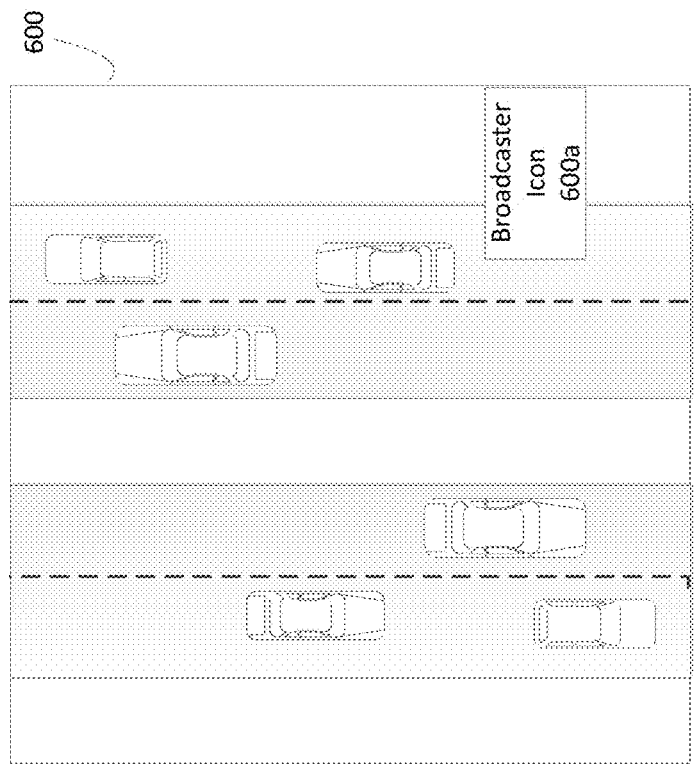
Figure 7:
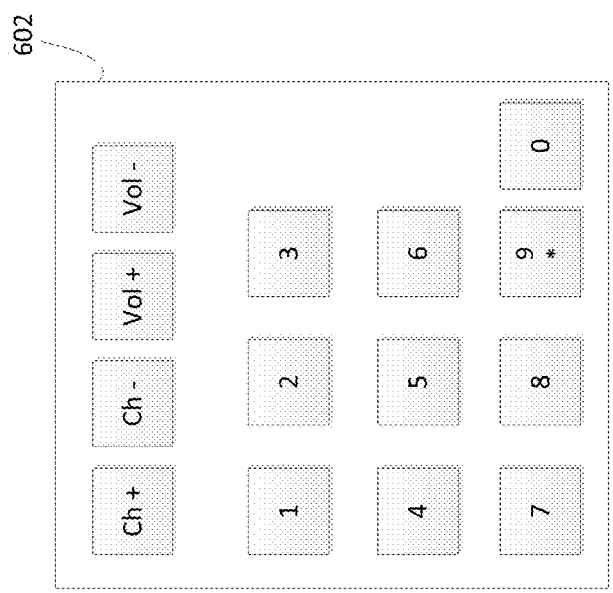
Figure 8:
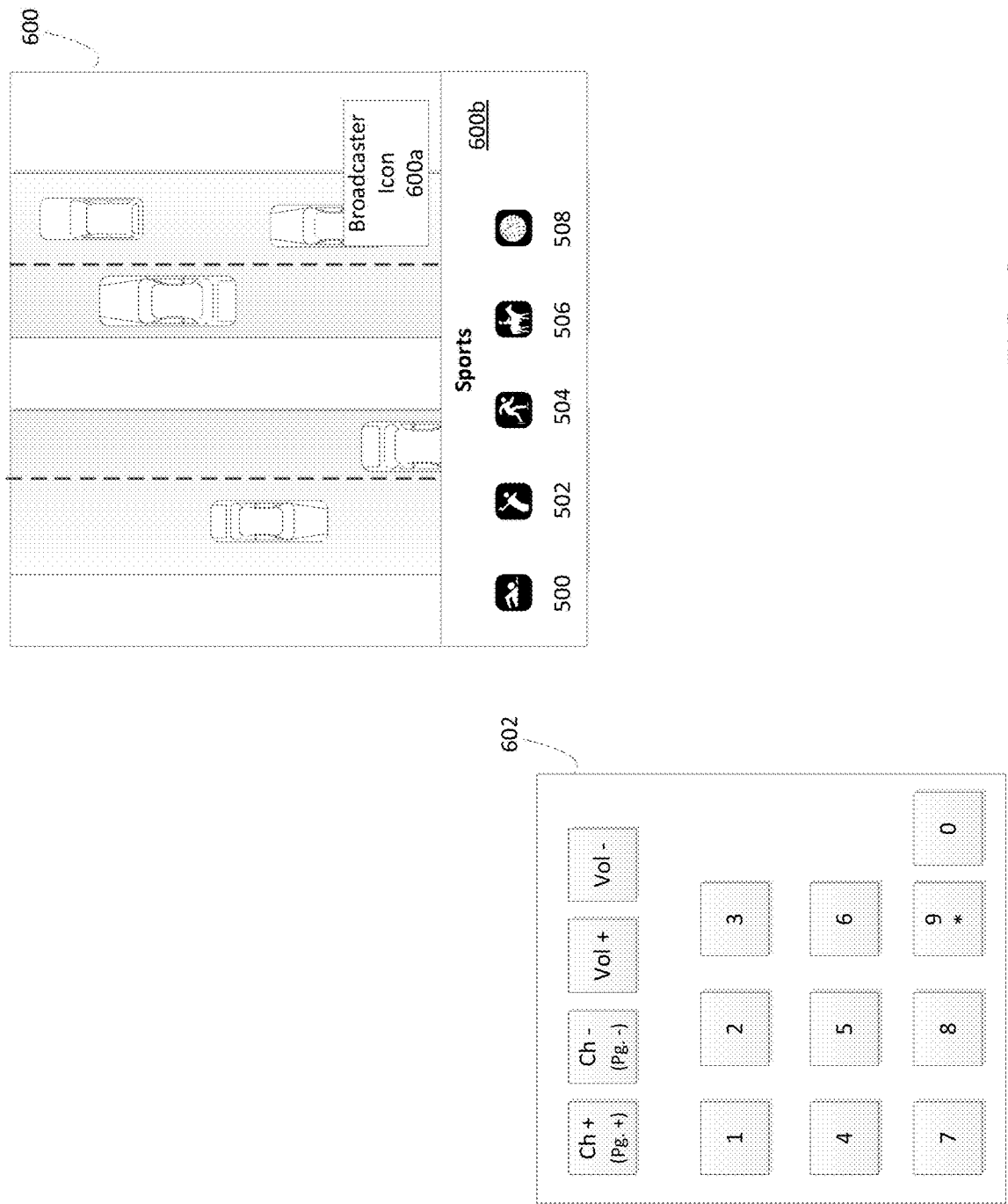

FIGS. 6-8 illustrate embodiments of a display 600 along with a corresponding input device 602. The display may be connected to a reception apparatus as illustrated in FIG. 3, where the reception apparatus is associated with the input device as illustrated in FIG. 2. In FIG. 6, only a television receiver application may be running to display television content. Since only the television receiver application is running in this example, the input device 602 may be configured to perform expected remote control functions specified by the television receiver application such as change a channel up (Ch +) or down (Ch −), increase the volume (Vol +) or decrease the volume (Vol −), or enter a desired channel number by entering any one of numeric keys 0-9.

FIG. 7 illustrates another embodiment in which both the television receiver application and broadcaster application are running. In this example, the television receiver application displays the television content corresponding to a selected ATSC 3.0 service (e.g., content displaying driving cars) while the broadcaster application may be running in the background, or cause content to be displayed such as a broadcaster icon 600*a* with any associated advertising info. Furthermore, the broadcaster application may have reserved one of the keys of the input device 602 such as numeric key 9, which is indicated by a *. If the keys of input device 602 are displayed as an electronic display, the display of the keys may be updated such that the keys reserved by the broadcaster application are changed to indicate that these keys are available to activate one or more functions of the broadcaster web icon. For example, if the broadcaster application reserves the numeric key 9, the symbol * may replace the number 9 or placed underneath the number 9. In one example, when the number 9 is pressed while the broadcaster application is running, the broadcaster application may retrieve content such as an advertisement from a remote server and display the retrieved content within the television content such as in the area designated by broadcaster icon 600*a*.

FIG. 8 illustrates another embodiment in which the television receiver application, broadcaster application, and the native broadcaster application are each executed simultaneously. In this example, with respect to the embodiment illustrated in FIG. 7, the broadcaster application may cause the native broadcaster application to be executed resulting in an electronic programming guide 600*b* to be displayed within the television content. Furthermore, the native broadcaster application may be designed to reserve the Ch+ and Ch− keys such that the function of these keys is changed to scroll up a page (e.g. Pg+) or scroll down a page (e.g., Pg−) within the electronic programming guide 600*b*. In some embodiments, the native broadcaster application is configured to scroll only to the services (e.g. channels) that are associated with the broadcaster (e.g. ZTV). Further, in some embodiments, the native broadcaster application is configured to scroll to other show times for the currently viewed television content and/or indicate repeat showings of the television content currently being viewed.

Figure 9:
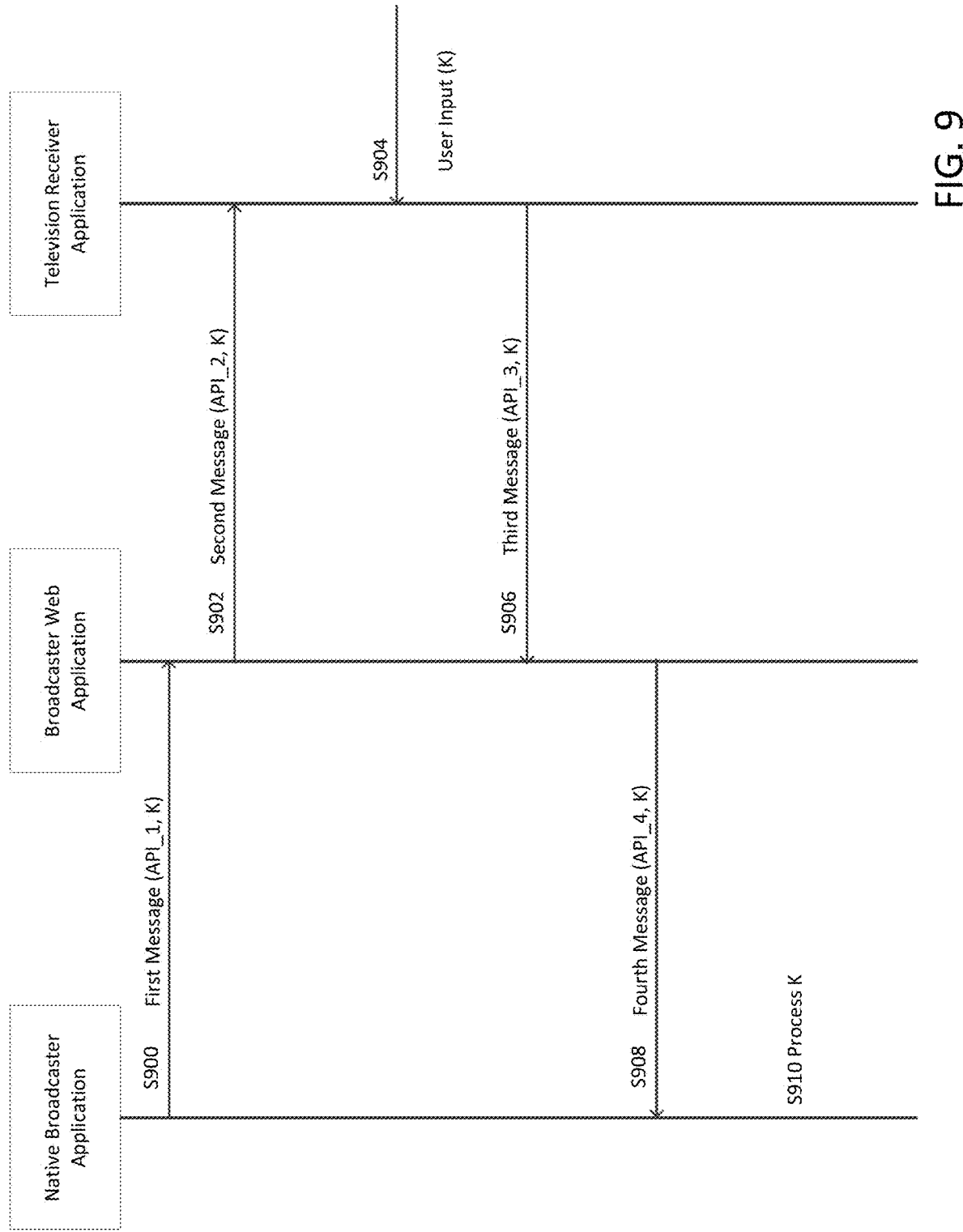
FIG. 9 illustrates an exemplary sequence diagram between a television receiver application, a broadcaster application, and a native broadcaster application.

FIG. 9 illustrates a sequence diagram illustrating a process for reserving keys by the native broadcaster application according to some embodiments. A similar process can be applied for other types of applications or other native applications that are not provided by the broadcaster. In step S900, the native broadcaster application sends a first message via a first API (API_1) to the broadcaster application in which the first message specifies one or more keys (K) that the native broadcaster application requests to reserve to perform one or more functions specified by the native broadcaster application. In step 902, the broadcaster application responds to this message by sending a second message to the television receiver application via a second API (API_2) in which the second message specifies the one or more keys (K) specified in the first message. In step S904, the television receiver application receives a user input that includes the one or more keys (K) specified in the second message.

Accordingly, in step S906, when any of the keys specified in the second message is received by the television receiver application, a third message is sent to the broadcaster application via a third API (API_3) in which the third message specifies the one or more keys (K). In step S908, when the broadcaster application receives a message that specifies any of the keys specified in the first message, the broadcaster application sends a fourth message via a fourth API (API_4) specifying the one or more keys (K) to the native broadcaster application. In step 910, upon reception of the fourth message, the native broadcaster application processes the specified one or more keys (K) and performs a designated function assigned to the one or more keys (K).

The process illustrated in FIG. 9, provides the significantly advantageous features of enabling a native broadcaster application to access certain keys that would otherwise be processed by the television receiver application to perform functions like changing a channel. In some embodiments, the first and fourth APIs (API_1 and API_4) are proprietary APIs designed by the DTV manufacturer and/or broadcaster (e.g., ZTV) in coordination with one another to enable communication between the native broadcaster application and the broadcaster application. Alternatively, a DTV manufacturer may develop these proprietary APIs independently from any broadcaster entity and make them available for use by any broadcasters wishing to use the corresponding API capabilities offered by products made by that manufacturer. The first and fourth APIs (API_1 and API_4) may be the same API (e.g. one API that operates in a request/response manner). In some embodiments, the second and third APIs (API_2 and API_3) are any preexisting API that enables communication between the broadcaster application and television receiver application such as the WebSocket APIs defined in the A/344 Standard at Section 9.11 (Keys APIs).

Figure 10A:
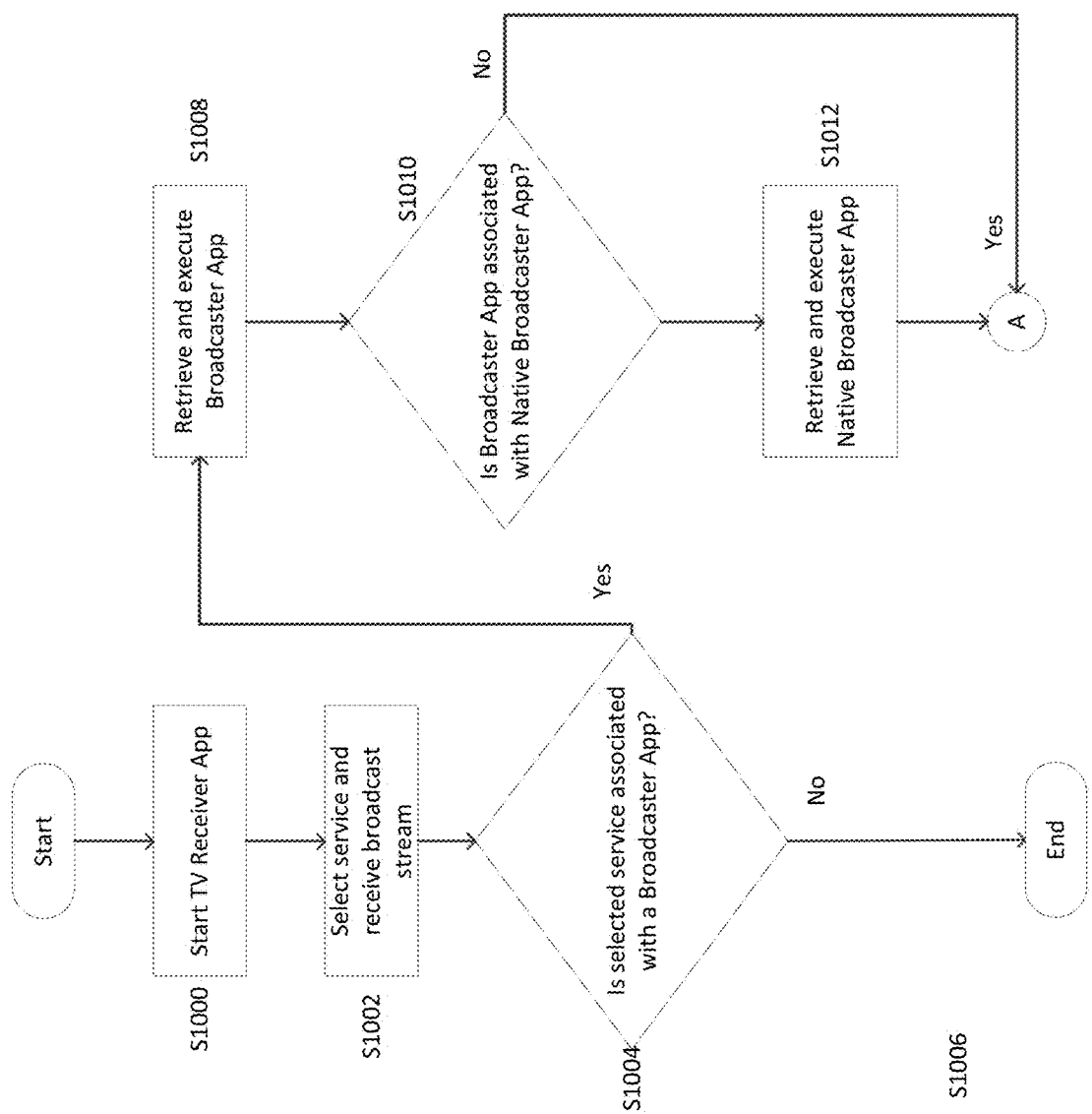
FIGS. 10A, 10B, and 11 illustrate exemplary flow charts of processes performed by the reception apparatus.
Figure 10B:
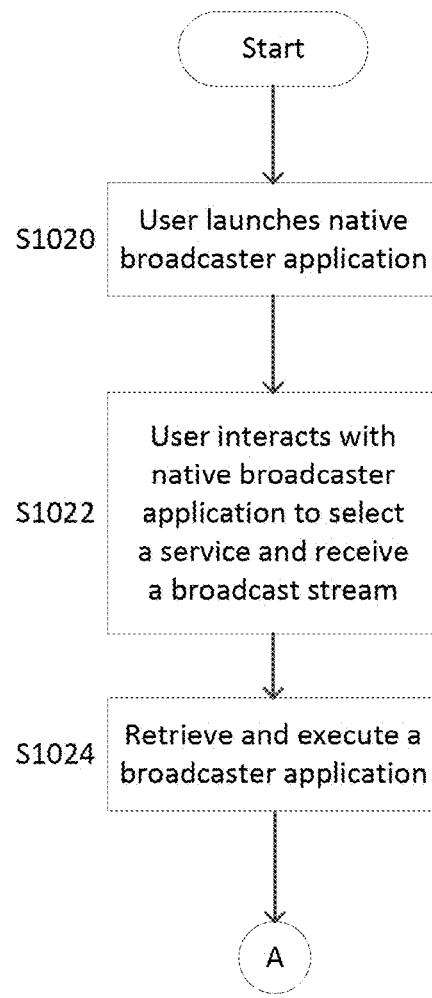
Figure 11:
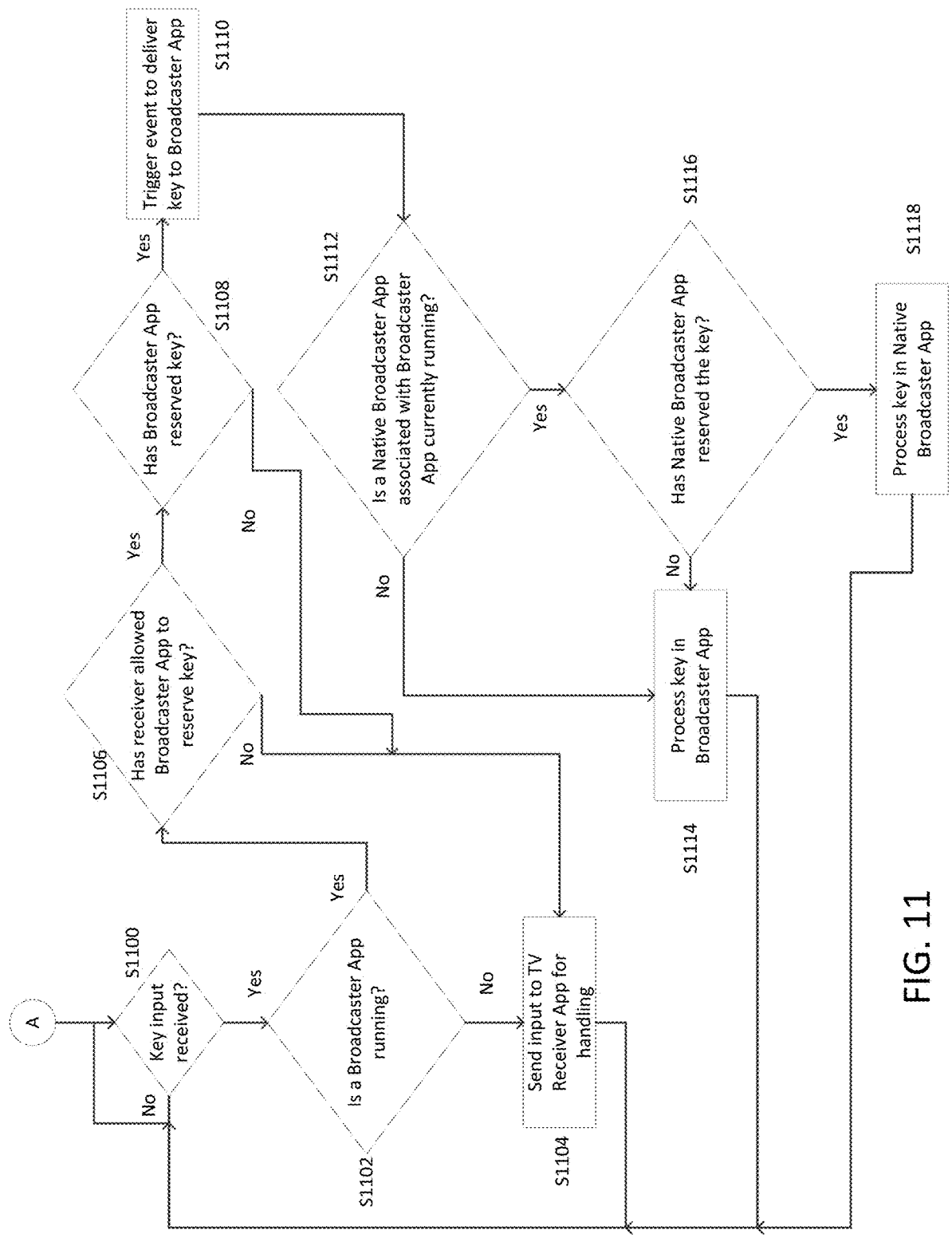

FIGS. 10A, 10B and 11 illustrate an embodiment of a process performed, for example, by a television receiver apparatus such as the reception apparatus 120 (FIG. 1). The process starts at S1000 where a television receiver application is started. This application may be opened by selection of an icon displayed on a screen, or by turning on a device that is configured to operate as a television. In step S1002, a service is selected and a broadcast stream containing the service is received at the receiver. For example, the user may select a program or channel of a broadcaster to be displayed on the user's television, which causes a broadcast stream containing the program to be transmitted to the television reception apparatus.

In step S1004, the process determines whether the selected service is associated with a broadcaster application. If the selected service is associated with a broadcaster application, the process proceeds to step S1008 to retrieve and execute the broadcaster application. For example, the broadcaster application may be retrieved from a server identified in the broadcast stream. In another example, the broadcaster application may be included in the broadcast stream that includes the selected service. If the selected service is not associated with a native broadcaster application, the process ends without any broadcaster application being launched.

Returning to step S1008, where it has been previously determined that a selected service is associated with a broadcaster application, the process proceeds from step S1008 to step S1010 to determine whether the retrieved broadcaster application is associated with a native broadcaster application that is already present in the receiver memory. If the broadcaster application is not associated with the native broadcaster application, the process proceeds to process A (FIG. 11). If the broadcaster application is associated with the native broadcaster application, the process proceeds to step S1012 where the native broadcaster application is launched. As an example, the native broadcaster application may be pre-installed and locally located on the television reception apparatus. The process proceeds from step S1012 to process A (FIG. 11).

FIG. 10B illustrates an embodiment of another process performed by the reception apparatus 120. In this embodiment, all services that are accessible by navigation within a native broadcaster application have associated broadcaster applications. The process may start at step S1020, where a user launches a native broadcaster application. In step S1022, the user interacts with the native broadcaster application to select a service provided by the broadcaster and receives a broadcast stream that includes the service. In step S1024, a broadcaster application that is associated with the currently executing native broadcaster application is retrieved and executed. This broadcaster application may be provided within the broadcast stream associated with the selected service.

FIG. 11 illustrates a continuation of the processes illustrated in FIGS. 10A and 10B. In step S1100, the process waits for a key input indicating selection of a key to be received. When a key input is received, the process proceeds to step S1102 to determine if a broadcaster application is currently running. If the broadcaster application is not currently running, the process proceeds from step S1102 to S1104 where the television receiver application handles the key input. In some embodiments, the process may skip this step and check directly for reservations of one or more key inputs. The process returns from step S1104 to step S1100.

If the broadcaster application is currently running, the process proceeds from step S1102 to S1106 to determine if the receiver has allowed the broadcaster application to reserve the selected key. If the receiver determines that the broadcaster application is not permitted to reserve the selected key (e.g., request to reserve key by broadcaster application is rejected), the process returns to step S1104. However, if the receiver has allowed the selected key to be reserved by the broadcaster application, the process proceeds from step S1106 to step S1108 to determine whether the broadcaster application has reserved the selected key.

If the broadcaster application has successfully reserved the key, the process proceeds from step S1108 to step S1110 to trigger an event to deliver the key to the broadcaster application. For example, if the television receiver application determines that the broadcaster application has reserved the selected key, the television receiver application forwards the selected key via an API to the broadcaster application.

The process proceeds from step S1110 to step S1112 to determine, by the broadcaster application for example, if a native broadcaster application (or other type of application or native application) associated with the broadcaster application is currently running. In some embodiments, the process may skip this step and check directly for reservations of one or more key inputs. If the native broadcaster application is not currently running, the process proceeds to step S1114 where the selected key is processed by the broadcaster application. The process returns from step S1114 to step S1100. If the native broadcaster application is currently running, the process proceeds from step S1112 to step 1116 to determine whether the native broadcaster application has reserved the selected key. If the native broadcaster application has reserved the selected key, the process proceeds from step S1116 to step S1118 where the native broadcaster application processes the selected key. The process returns from step S1118 to step S1100. If the native broadcaster application has not reserved the selected key, the process proceeds from step S1116 to step S1114.

In some embodiments, Steps S1112 through S1118 are implemented within code supplied by the broadcaster, e.g. in the broadcaster application and native broadcaster application. The logic in FIG. 11 illustrates one scenario; many others are possible. By communicating between themselves, the broadcaster application and native broadcaster application can determine how to handle any user keypress events.

In some embodiments, when the broadcaster application is terminated, the native broadcaster application can use APIs to manage keys with the television receiver application. In some embodiments, these APIs are proprietary APIs that enable the native broadcaster application to communicate with the television receiver application. In some embodiments, when the broadcaster application is terminated and another broadcaster application is executed, the process in FIG. 11 proceeds with the another broadcaster application replacing the broadcaster application for each process step of FIG. 11.

Figure 12:
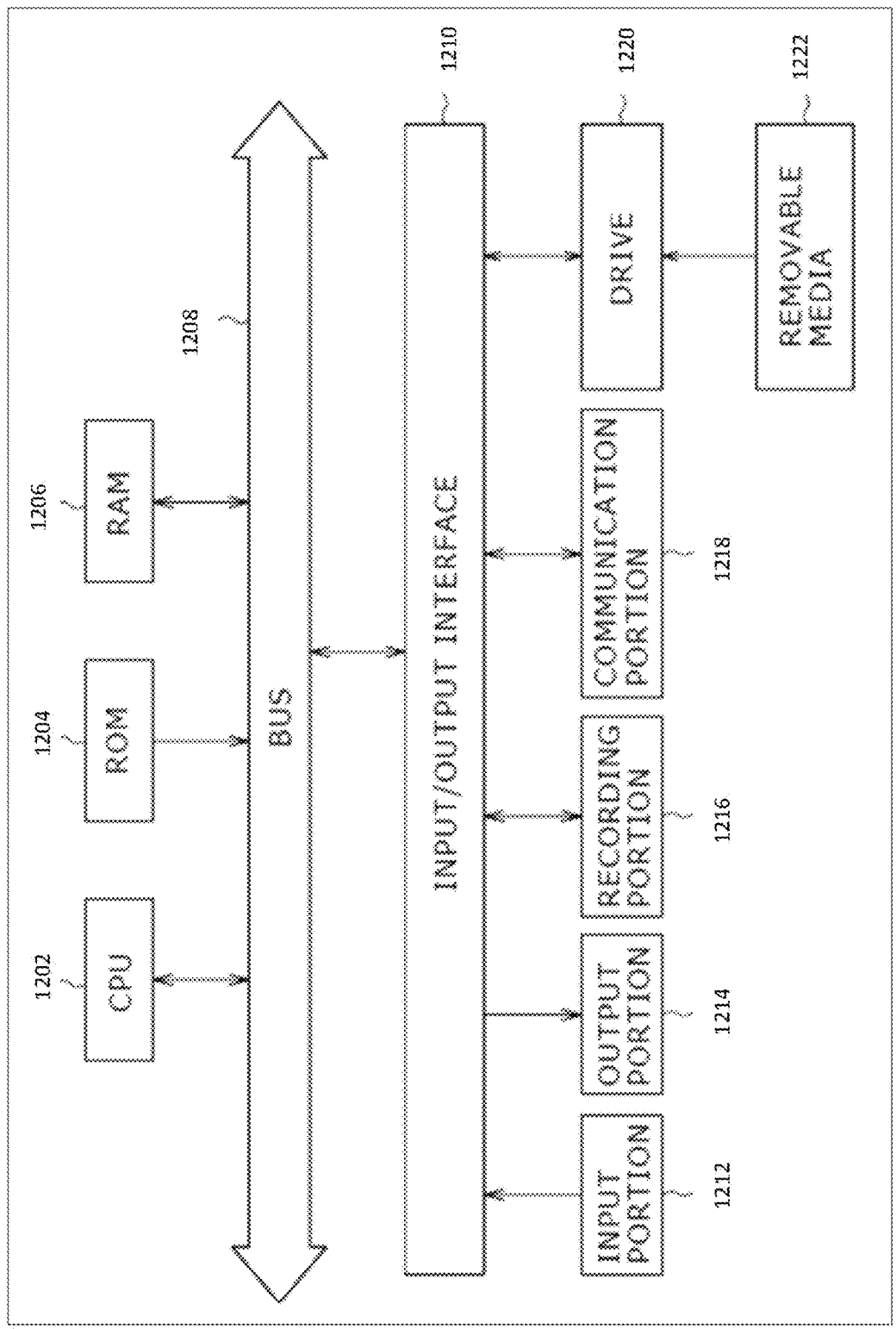
FIG. 12 illustrates an example hardware configuration of a computer.

FIG. 12 is a block diagram showing an example of a hardware configuration of a computer that can be configured to perform functions of any one or a combination of reception apparatus and service distribution system. For example, in one embodiment, the computer is configured to perform one or a combination of the functions or steps described herein with respect to the reception apparatus 20 and/or the service provider 102.

As illustrated in FIG. 12 the computer includes a CPU 1202, ROM (read only memory) 1204, and a RAM (random access memory) 1206 interconnected to each other via one or more buses 1208. The one or more buses 1208 are further connected with an input-output interface 1210. The input-output interface 1210 is connected with an input portion 1212 formed by a keyboard, a mouse, a microphone, remote controller, etc. The input-output interface 1210 is also connected to an output portion 1214 formed by an audio interface, video interface, display, speaker and the like; a recording portion 1216 formed by a hard disk, a non-volatile memory or other non-transitory computer readable storage medium; a communication portion 1218 formed by a network interface, modem, USB interface, fire wire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or a combination of the functions described herein with respect to the reception apparatus 120 and/or the service provider 102.

The hardware description above, exemplified by any one of the structure examples shown in FIGS. 2 and 12, constitutes or includes specialized corresponding structure that is programmed or configured to perform the algorithm describe above, for example with reference to FIGS. 9-11. For example, any one or a combination of the algorithms shown in FIGS. 9-11 may be completely performed by the circuitry included in the single device shown in FIG. 2.

Obviously, numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

The above disclosure also encompasses the embodiments listed below.

(1) A reception apparatus including receiver circuitry configured to receive a broadcast stream that includes television content; and processing circuitry configured to execute a television receiver application that displays the television content, receive indication of a selection of a key that is provided on an input device, in response to reception of the indication of the selection of the key, determine whether a broadcaster application has reserved the selected key, in response to the determination that the broadcaster application has reserved the selected key, determine whether a native application associated with the broadcaster application has reserved the selected key, and process, by the native application, the selected key in accordance with a first predetermined function specified by the native application in response to the determination that the broadcaster application has reserved the selected key and the native application has reserved the selected key.

(2) The reception apparatus according to feature (1), in which the processing circuitry is further configured to process, by the broadcaster application, the selected key in accordance with a second predetermined function specified by the broadcaster application in response to the determination that the broadcaster application has reserved the key and the native application has not reserved the selected key.

(3) The reception apparatus according to feature (2), in which the processing circuitry is further configured to process, by the television receiver application, the selected key in accordance with a third predetermined function specified by the television receiver application in response to the determination that the broadcaster application has not reserved the selected key.

(4) The reception apparatus according to any of features (1) to (3), in which the broadcaster application is included in the broadcast stream.

(5) The reception apparatus according to feature (4), in which the native application is located locally on the reception apparatus, and the broadcaster application includes an instruction that causes the native application to be retrieved and/or executed.

(6) The reception apparatus according to any of features (1) to (5), in which the broadcaster application is configured to reserve the selected key by submission of a command to the television receiver application via a first application programming interface (API) that is located locally on the reception apparatus.

(7) The reception apparatus according to feature (6), in which the native application is configured to reserve the selected key by submission of a command to the broadcaster application via a second API that is different from the first API.

(8) The reception apparatus according to any of features (1) to (7), in which the first predetermined function specified by the native application is a command to display an electronic programming guide.

(9) The reception apparatus according to any of features (2) to (8), in which the second predetermined function specified by the broadcaster application is a command to retrieve content from a server remotely located from the reception apparatus, in which the processing circuitry is further configured to display the retrieved content with the television content.

(10) The reception apparatus according to any of features (3) to (9), in which the third predetermined function specified by the television receiver application is a command to perform a television function selected from a group consisting of: change a channel, change a volume of the displayed television content, and display a menu.

(11) A non-transitory computer-readable medium storing instructions, which when executed by a processor, cause the processor to perform a method including receiving a broadcast stream that includes television content; executing a television receiver application that displays the television content; receiving indication of a selection of a key that is provided on an input device; in response to reception of the indication of the selection of the key, determining whether a broadcaster application has reserved the selected key; in response to the determining that the broadcaster application has reserved the selected key, determining whether a native application associated with the broadcaster application has reserved the selected key; and processing, by the native application, the selected key in accordance with a first predetermined function specified by the native application in response to the determination that the broadcaster application has reserved the selected key and the native application has reserved the selected key.

(12) The non-transitory computer-readable medium according to feature (11), in which the method further comprises processing, by the broadcaster application, the selected key in accordance with a second predetermined function specified by the broadcaster application in response to the determination that the broadcaster application has reserved the key and the native application has not reserved the selected key.

(13) The non-transitory computer-readable medium according to feature (12), in which the method further comprises processing, by the television receiver application, the selected key in accordance with a third predetermined function specified by the television receiver application in response to the determination that the broadcaster application has not reserved the selected key.

(14) The non-transitory computer-readable medium according to any of features (11) to (13), in which the broadcaster application is included in the broadcast stream, and the native application is stored on the non-transitory computer-readable medium before the broadcaster application is provided in the broadcast stream.

(15) The non-transitory computer-readable medium according to any of features (11) to (14), in which the broadcaster application is configured to reserve the selected key by submission of a command to the television receiver application via a first application programming interface (API) that is located locally on the reception apparatus.

(16) The non-transitory computer-readable medium according to feature (15), in which the native application is configured to reserve the selected key by submission of a command to the broadcaster application via a second API that is different from the first API.

(17) A non-transitory computer readable medium storing instructions, which when executed by a processor, cause the processor to perform a method comprising receiving, from a television receiver application, a first message indicating a user selection of a key; in response to receiving the first message from the television receiver application, determining whether the selected key has been reserved by a native broadcaster application; processing the selected key in accordance with a predetermined function in response to determining that the native broadcaster application has not reserved the selected key; and sending, in a second message, the selected key to the native broadcaster application in response to determining that the native broadcaster application has reserved the selected key.

(18) The non-transitory computer readable medium according to feature (17), in which the method further comprises prior to receiving the first message from the television receiver application: receiving, in a third message, a request from the native broadcaster application to reserve the selected key; and in response to receiving the third message, forwarding, in a fourth message, a request to the television receiver application to reserve the selected key.

(19) The non-transitory computer readable medium according to feature (18), in which the first and fourth messages with the television receiver application are sent via first application programming interface (API), and the second and third messages with the native broadcaster application are sent via a second API different from the first API.

(20) The non-transitory computer readable medium, according to any of features (17) to (19), in which the instructions are provided in a broadcast stream that includes television content, and the native broadcaster application is stored on non-transitory computer readable medium prior to the instructions being provided in the broadcast stream.

The invention claimed is:

1. A reception apparatus comprising:
   receiver circuitry configured to receive a broadcast stream that includes television content; and
   processing circuitry configured to:
      execute a television receiver application that displays the television content,
      receive indication of a selection of a key that is provided on an input device,
      in response to reception of the indication of the selection of the key, determine whether a broadcaster application has reserved the selected key,
      in response to the determination that the broadcaster application has reserved the selected key, determine whether a native application associated with the broadcaster application has reserved the selected key, and
      process, by the native application, the selected key in accordance with a first predetermined function specified by the native application in response to the determination that the broadcaster application has reserved the selected key and the native application has reserved the selected key.

2. The reception apparatus according to claim 1, wherein the processing circuitry is further configured to:
   process, by the broadcaster application, the selected key in accordance with a second predetermined function specified by the broadcaster application in response to the determination that the broadcaster application has reserved the key and the native application has not reserved the selected key.

3. The reception apparatus according to claim 2, wherein the processing circuitry is further configured to:
   process, by the television receiver application, the selected key in accordance with a third predetermined function specified by the television receiver application in response to the determination that the broadcaster application has not reserved the selected key.

4. The reception apparatus according to claim 1, wherein the broadcaster application is included in the broadcast stream.

5. The reception apparatus according to claim 4, wherein the native application is located locally on the reception apparatus, and the broadcaster application includes an instruction that causes the native application to be retrieved and/or executed.

6. The reception apparatus according to claim 1, wherein the broadcaster application is configured to reserve the selected key by submission of a command to the television receiver application via a first application programming interface (API) that is located locally on the reception apparatus.

7. The reception apparatus according to claim 6, wherein the native application is configured to reserve the selected key by submission of a command to the broadcaster application via a second API that is different from the first API.

8. The reception apparatus according to claim 1, wherein the first predetermined function specified by the native application is a command to display an electronic programming guide.

9. The reception apparatus according to claim 2, wherein the second predetermined function specified by the broadcaster application is a command to retrieve content from a server remotely located from the reception apparatus, wherein the processing circuitry is further configured to display the retrieved content with the television content.

10. The reception apparatus according to claim 3, wherein the third predetermined function specified by the television receiver application is a command to perform a television function selected from a group consisting of: change a channel, change a volume of the displayed television content, and display a menu.

11. A non-transitory computer-readable medium storing instructions, which when executed by a processor, cause the processor to perform a method comprising:
receiving a broadcast stream that includes television content;
executing a television receiver application that displays the television content;
receiving indication of a selection of a key that is provided on an input device;
in response to reception of the indication of the selection of the key, determining whether a broadcaster application has reserved the selected key;
in response to the determining that the broadcaster application has reserved the selected key, determining whether a native application associated with the broadcaster application has reserved the selected key; and
processing, by the native application, the selected key in accordance with a first predetermined function specified by the native application in response to the determination that the broadcaster application has reserved the selected key and the native application has reserved the selected key.

12. The non-transitory computer-readable medium according to claim 11, wherein the method further comprises:
processing, by the broadcaster application, the selected key in accordance with a second predetermined function specified by the broadcaster application in response to the determination that the broadcaster application has reserved the key and the native application has not reserved the selected key.

13. The non-transitory computer-readable medium according to claim 11, wherein the method further comprises:
processing, by the television receiver application, the selected key in accordance with a third predetermined function specified by the television receiver application in response to the determination that the broadcaster application has not reserved the selected key.

14. The non-transitory computer-readable medium according to claim 11, wherein the broadcaster application is provided in the broadcast stream, and the native application is stored on the non-transitory computer-readable medium before the broadcaster application is provided in the broadcast stream.

15. The non-transitory computer-readable medium according to claim 11, wherein the broadcaster application is configured to reserve the selected key by submission of a command to the television receiver application via a first application programming interface (API) that is located locally on the reception apparatus.

16. The non-transitory computer-readable medium according to claim 15, wherein the native application is configured to reserve the selected key by submission of a command to the broadcaster application via a second API that is different from the first API.

17. A non-transitory computer readable medium storing instructions, which when executed by a processor, cause the processor to perform a method comprising:
receiving, from a television receiver application, a first message indicating a user selection of a key;
in response to receiving the first message from the television receiver application, determining whether the selected key has been reserved by a native broadcaster application;
processing the selected key in accordance with a predetermined function in response to determining that the native broadcaster application has not reserved the selected key; and
sending, in a second message, the selected key to the native broadcaster application in response to determining that the native broadcaster application has reserved the selected key.

18. The non-transitory computer readable medium according to claim 17, wherein the method further comprises:
prior to receiving the first message from the television receiver application:
receiving, in a third message, a request from the native broadcaster application to reserve the selected key; and
in response to receiving the third message, forwarding, in a fourth message, the request to the television receiver application to reserve the selected key.

19. The non-transitory computer readable medium according to claim 18, wherein the first and fourth messages with the television receiver application are sent via first application programming interface (API), and the second and third messages with the native broadcaster application are sent via a second API different from the first API.

20. The non-transitory computer readable medium, according to claim 17, wherein the instructions are provided in a broadcast stream that includes television content, and the native broadcaster application is stored on non-transitory computer readable medium prior to the instructions being provided in the broadcast stream.

* * * * *